United States Patent [19]

Takahashi et al.

[11] 4,416,979
[45] Nov. 22, 1983

[54] PHOTOGRAPHIC LIGHT-SENSITIVE ELEMENT WITH NITROPHYENYLAZO METAL COMPLEXABLE DYE

[75] Inventors: Jiro Takahashi; Tawara Komamura, both of Hachioji; Ryuichiro Kobayashi, Tokyo, all of Japan

[73] Assignee: Konishiroku Photo Industry Co., Ltd., Tokyo, Japan

[21] Appl. No.: 375,545

[22] Filed: May 6, 1982

[30] Foreign Application Priority Data

May 8, 1981 [JP]  Japan .................................. 56-69879

[51] Int. Cl.³ .......................... G03C 7/00; G03C 5/54; G03C 1/40; G03C 1/10
[52] U.S. Cl. .................................. 430/562; 430/222; 430/223; 430/226; 430/561; 430/563
[58] Field of Search ............... 430/222, 223, 224, 225, 430/226, 562, 241, 242, 561, 563

[56] References Cited

U.S. PATENT DOCUMENTS 3,942,987  3/1976  Landholm et al. .................. 430/562
4,147,544  4/1979  Anderson et al. ................... 430/223

*Primary Examiner*—Richard L. Schilling
*Attorney, Agent, or Firm*—Finnegan, Henderson, Farabow, Garrett & Dunner

[57] ABSTRACT

A photographic light-sensitive element for a color diffusion transfer process which has a silver halide emulsion layer and also employs a nondiffusible cyan dye releasing compound. The compound is capable of releasing a diffusible metallic complex which forms an azo dye under alkaline conditions as a function of the development of the silver halide in said silver halide emulsion layer.

6 Claims, No Drawings

PHOTOGRAPHIC LIGHT-SENSITIVE ELEMENT WITH NITROPHYENYLAZO METAL COMPLEXABLE DYE

The present invention relates to a photographic light-sensitive element for a color diffusion transfer process which contains a nondiffusible dye releasing compound. More particularly the invention relates to a color diffusion transfer photographic light-sensitive element containing a nondiffusible cyan dye releasing compound which is capable of releasing a diffusible metallic complex which in turn forms an azo dye (including the precursor thereof) under an alkaline condition in connection with the development of a silver halide emulsion layer. The released dye forms a stable metallic complex azo dye with multivalent metallic ions in an image-receiving layer.

Azo dye developing agents containing metallic complex forming groups are described in, e.g., U.S. Pat. Nos. 3,081,167, 3,196,014, 3,299,041, 3,453,107, 3,563,739, 3,544,545, 3,551,406, and 4,014,700. However, since the developing components of such an azo dye are reactive groups, they have a tendency to develop not only the silver halide emulsion layer, but also the light-exposed portions of all the emulsion layers contiguous thereto. Therefore, use of these azo dye developers results in the development of undesired layers, which can cause an undesirable interimage effect. With the present invention by employing an improved color transfer system, the desired dye is uniformly diffused in a photographic film unit without being immobilized in an undesirable region. In this system, no dye is combined with reactive components such as the developer.

In order to avoid the disadvantages caused by interimage effect experienced with prior art developing agents, while still utilizing the excellent resistance to light and diffusibility that metallic complex azo dyes, offer often one should use a non-diffusible dye releasing compound that does not form any metallic complex during the initial stages of the diffusion transfer; However, the nondiffusible dye releasing compounds must also easily form a metallic complex azo dye with the metal contained in the image-receiving layer, or in the layer contiguous thereto, at the time of or immediately before completion of the diffusion transfer. Color diffusion transfer photographic light-sensitive elements containing these nondiffusible dye releasing compounds having such a nature are described in U.S. Pat. Nos. 4,142,891, 4,147,544, 4,148,641, 4,418,642 and 4,148,643, and Research Disclosure 17334 (1978) and 18022 (1979), and the like.

However, the dyes released by conventional techniques from the a nondiffusible dye releasing compounds listed in the above patents are not satisfactory with respect to obtaining a stable color which is light-resistant over a broad pH range. Consequently, a strong demand has been made for the development of nondiffusible dye releasing compounds capable of releasing such dyes that resist light and provide a stable color over a broad pH range.

SUMMARY OF THE INVENTION

It is an object of the present invention to provide a photographic light-sensitive element having a nondiffusible cyan dye releasing compound capable of releasing a metallic complex which in turn forms an azo dye which has excellent light resistance characteristics and provides a stable color over a broad pH range.

Having devoted ourselves to studies on the above problem, we have discovered that the above object can be accomplished by using a photographic light-sensitive material having on the support thereof at least one light-sensitive silver halide emulsion layer and a nondiffusible cyan dye releasing compound having at least one diffusible cyano-azo dye portion or the precursor portion thereof having the formula:

Formula (I)

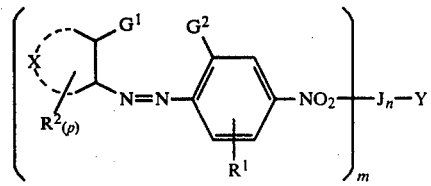

wherein $G^1$ and $G^2$ are each independently an hydroxyl group, an alkali metal salt thereof or a hydrolyzable group; $R^1$ is hydrogen, a halogen, an alkyl, an alkoxy, a substituted or an unsubstituted sulfamoyl, a substituted or an unsubstituted carbamoyl, an alkoxycarbonyl or cyano group; $R^2$ is $NH_2$, $NHR^4$, $N(R^4)_2$, $NHSO_2R^4$, $NHSO_2NHR^4$, $NHCOR^4$, $NHSO_3R^4$, OH, $OR^4$, $OCOR^4$ or $OCO_2R^4$ wherein $R^4$ is a substituted or unsubstituted alkyl or aryl; X is a group of atoms necessary to complete a naphthalene or benzene ring which may have a substitutent; Y is a ballasting carrier which is capable of releasing the diffusible cyan-azo dye as a function of developing the silver halide layer under an alkaline condition; J is a divalent bonding group; p is an integer of 1 or 2; m is an integer of from 1 to 3; and n is 0 or not more than m.

DETAILED DESCRIPTION OF THE PREFERRED EMBODIMENTS

The photographic light-sensitive element of the present invention is illustrated in further detail below:

The alkali metallic salts of the hydroxyl group represented by the $G^1$ and $G^2$ in Formula (I) include, e.g., sodium and potassium salts, while those hydrolyzable groups of the hydroxyl group include, e.g., an acetyl group. Those substituents of the benzene or naphthalene ring represented by the X in the formula include, e.g., halogens, lower alkyl and lower alkoxy groups having 1 or 2 carbon atoms. Further, those substituents of the sulfamoyl or carbamoyl group represented by the $R^1$ in the formula include, e.g., lower alkyls having from 1 to 5 carbon atoms and aryls such as benzene, naphthalene, and the like, $R^4$, the substituent to various substituents represented by $R^2$ in formula I, represents a further substitutable alkyl or aryl group. $R^4$ may include, e.g., halogens, cyano and lower alkoxy groups. $R^2$ may include besides those listed above, e.g., sulfamoyl and carbamoyl groups. And in the present invention, $R^2$, with the above substituents, is desired to be substituted in the eighth position of the naphthalene ring shown in Formula (II).

Formula II represents another nondiffusible cyan dye releasing compound. Formula II:

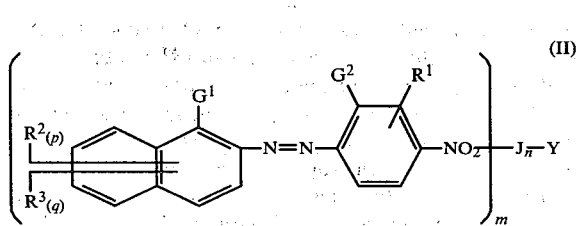

(II)

wherein $G^1$, $G^2$, $R^1$, $R^2$, Y, J, m and n have the same definition as in formula (I); $R^3$ represents —$SO_2NH_2$, —$SO_2NHR^4$, —$SO_3H$, —$CONH_2$, —$CONHR^4$ or —COOH, $R^4$ has the same definition as in formula (I); p is an integer of 1 or 2 and q is an integer of 0, 1 or 2.

Furthermore, Formula III represents another compound which fulfills the purposes of the invention.

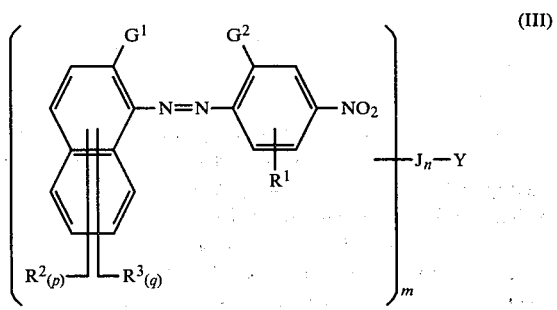

(III)

wherein $G^1$, $G^2$, $R^1$, $R^2$, $R^3$, Y, J, m, n, p, and q of respectively have the same definition as in formula (II).

The ballasting group in the ballasting carrier portion which is capable of releasing a diffusible azo dye represented by Y in Formulas (I) (II) and (III) includes organic groups having such number of carbon atoms as to be suitable for rendering the compound nondiffusible in an alkaline condition. The divalent bonding group represented by J includes those divalent groups represented by, e.g., —L—$NR^5)_a$—$M_b)_c$ or —L—$M_b$—$(NR^5)_a)_c$, wherein —L is a divalent group represented by $R^6$—$(O)_d$—$R_e^7$—, wherein $R^6$ and $R^7$ each is phenylene, substituted phenylene, alkylene or substituted alkylene, said $R^6$ and said $R^7$ being allowed to be either the same as or different from each other; d is 0 or 1; and e is 0 or 1; M is carbonyl or sulfonyl; $R^5$ is hydrogen, an alkyl or a substituted alkyl; a is 0 or 1; b is 0 or 1; and c is 0, 1 or 2, provided when the c is 2, the repeated L, R and M may be either the same as or different from one another; and further, J is combined in the number of n with the benzene or naphthalene ring one end of which is combined with Y and the other end of which is combined with $G^1$, or with the benzene with which $G^2$ is combined; and n is 0 or an integer of not more than m.

In the present invention, when m is not less than 2, the number of the azo dye portion combined with the ballasting carrier becomes not less than 2, so that not less than two dyes may be released from one carrier.

In the above formula, if the hydrolyzable group of $G^1$ is used, the absorption spectrum of this azo dye is shifted toward a shorter wavelength region, and the shifted dye absorbs light outside the light region to which the silver halide containing said dye is sensitive, so that the silver halide and the dye releasing compound may be allowed to coexist in the same layer.

In the present invention, for the ballasting carrier portion, those conventionally known may be arbitrarily used, but examples of those groups applicable to Y include those having the formula:

Formula (IV)

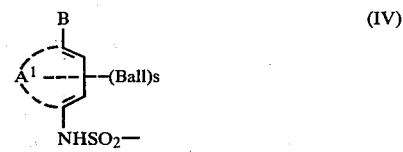

(IV)

wherein Ball is an organic ballasting group having such number of carbon atoms as to render the compound nondiffusible during the development in an alkaline processing composition; $A^1$ is a group of atoms necessary to form a benzene or naphthalene ring or a heterocyclic ring such as pyrazolone or pyrimidine, or the like; B is $OR^8$ or $NHR^9$, wherein $R^8$ is hydrogen or a group to be hydrolyzed to provide hydroxy group; $R^9$ is hydrogen, an alkyl or a substituted alkyl having from 1 to 20 carbon atoms, said alkyl being allowed to act itself as Ball; and s is 0, 1 or 2. Examples of those groups having Formula (IV) include:

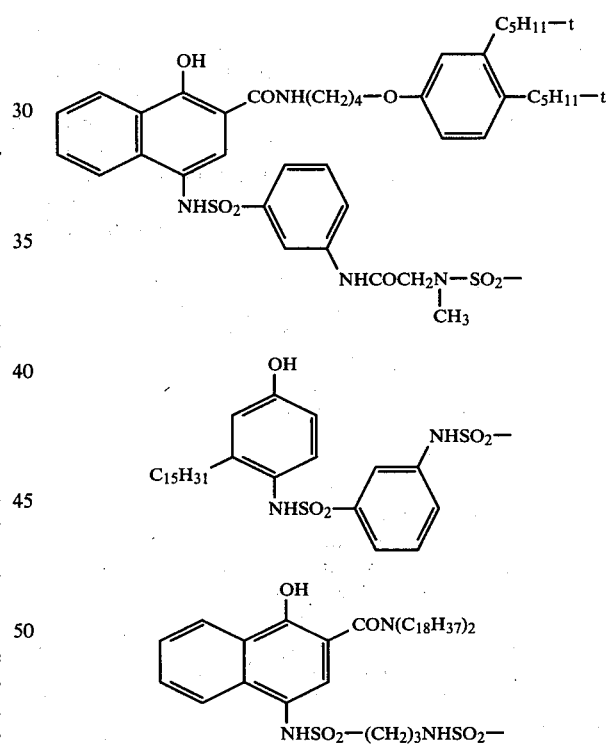

Further particular examples of the Y of this kind are described in Japanese Patent O.P.I. Publications No. 33826/1973 and No. 50736/1978. Different preferred examples for the Y include those having the formula:

Formula (V)

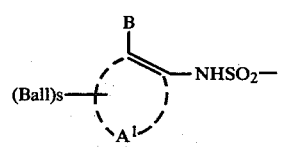

wherein, Ball, $A^1$, B and s are as defined in Formula (IV). Examples of those groups having Formula (V) include:

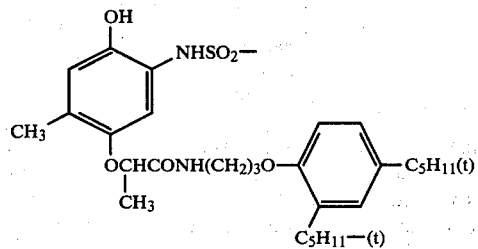

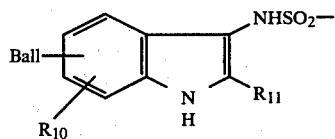

wherein Ball is as defined in Formula (IV); $R^{10}$ is hydrogen, a halogen, an alkyl or an alkoxy group; and $R^{11}$ is an alkyl, phenyl (including substituted phenyl) or carbamide group or hydrogen. Examples of this Y include the following groups;

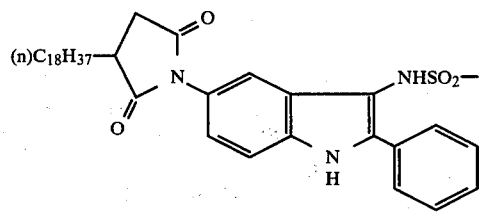

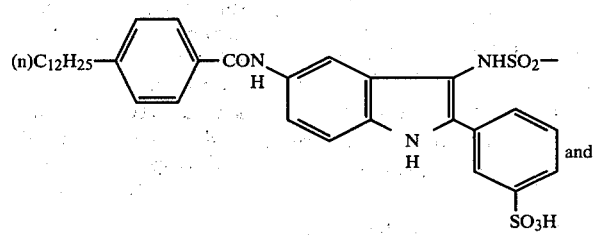

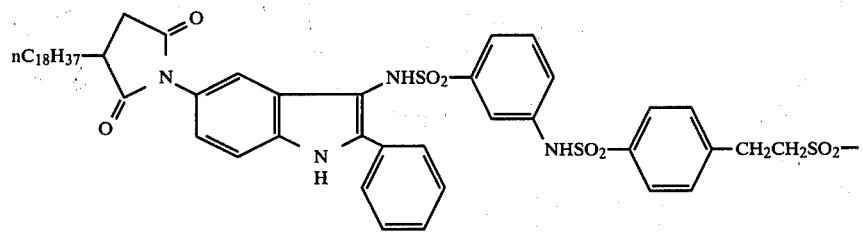

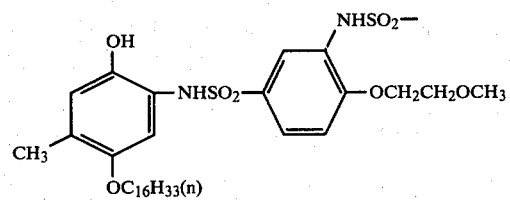

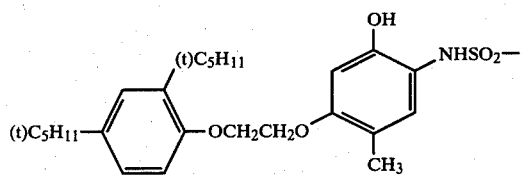

Further particular examples of the Y-Jn are described in Japanese Patent O.P.I. Publication No. 46730/1976. Also suitable for Y compounds of this type are those groups having the formula:
Formula (VI)

Further particular examples of group Y compounds are described in Japanese Patent Application No. 162940/1980. Also suitable as the Y compound, are those groups having the formula:
Formula (VII)

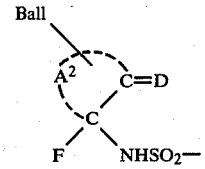

wherein Ball is as defined in Formula (IV); D is oxygen or equivalent to ND′ wherein Da′ is hydroxyl group or substituted or unsubstituted amino group; $A^2$ is a saturated or unsaturated nonaromatic hydrocarbon 5- to 7-membered ring, said hydrocarbon ring being allowed to be fused at an appropriate position thereof with an aromatic hydrocarbon ring or heterocyclic ring to form a condensed ring; and F is hydrogen or a halogen such as fluorine, chlorine or bromine. The following compounds are examples of this type

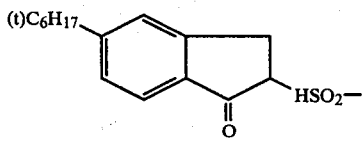

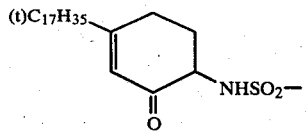

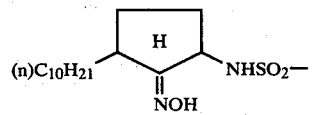

Further examples of group Y compounds are described in Japanese Patent O.P.I. Publication No. 3819/1978.

Those compounds represented by Formulas (IV), (V), (VI) and (VII) are such that the ballasting carrier portion or carrier portion thereof is oxidized by the oxide of a silver halide developer under alkaline conditions to thereby release a diffusible azo dye, and are called the dye releasable redox compound (DRR compound).

There are such Formula I compounds that the ballasting carrier portion or carrier portion in Formula (I) releases a diffusible azo dye as an inverse function of the development of a silver halide emulsion layer under alkaline conditions.

As the Y suitable for this type of compounds, there are those having the formula:
Formula (VIII)

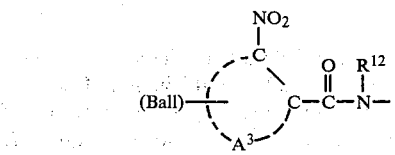

wherein Ball is as defined in Formula (IV); $A^3$ is a group of atoms necessary to complete a benzene ring (including the benzene ring having various substituents), said benezene ring being allowed to be condensed at an appropriate position thereof with a carbon ring or with a heterocyclic ring; and $R^{12}$ is an alkyl group (including substituted alkyl group). Examples of Formula (VIII) compounds include the following:

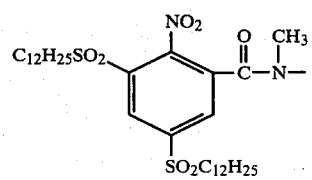

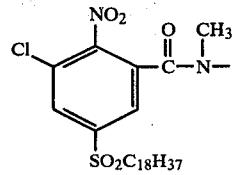

Further particular examples of this Y are described in Japanese Patent O.P.I. Publication No. 110828/1978.

As secondary examples of Y compounds of this kind, there are those groups having the formula:
Formula (IX)

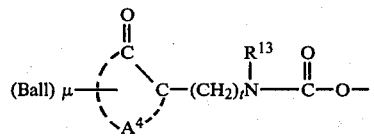

wherein Ball is as defined in Formula (IV); $A^4$ is a quinone nucleus (wherein said nucleus may have various substituents); t is an integer of 1 or 2; $R^{13}$ is an alkyl group having from 1 to 40 carbon atoms or an aryl or substituted aryl group having from 6 to 40 carbon atoms; and $\mu$ is 0 or 1, provided the $\mu$ is 1 when $R^{13}$ is a group having not more than 8 carbon atoms. The alkyl in $R^{13}$ may also be substituted.

Examples of those groups having Formula (IX) include the following:

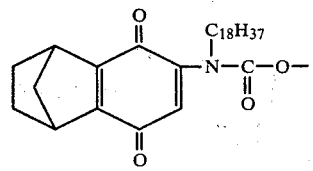

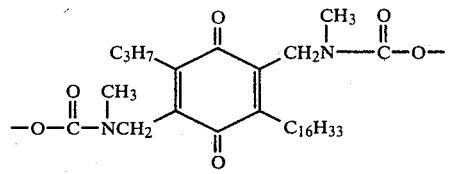

Further examples of Y compounds of this kind are described in Japanese Patent O.P.I. Publication No. 110827/1978.

Further, a third group of compounds suitable as Y are those having the formula:

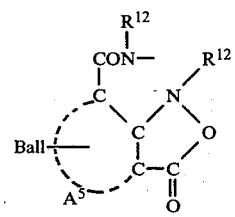

wherein Ball, and $R^{12}$ are as defined in Formula (VIII) and $A^5$ is a group of atoms necessary to complete a benzene ring (including a benzene ring having various substituents), said benzene ring being allowed to be condensed at an appropriate position with a carbon ring or with a heterocyclic ring. Examples of those groups having Formula (X) include the following:

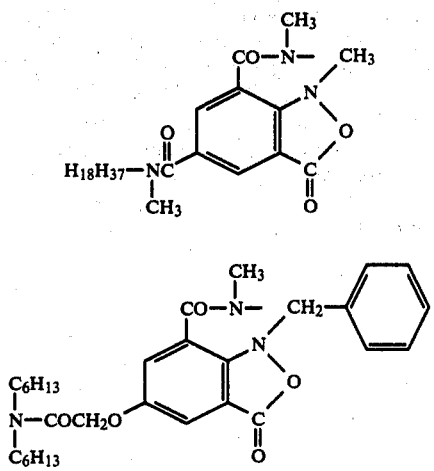

Further examples of Y compounds of this kind are described in Japanese Patent O.P.I. Publications No. 111628/1974 and No. 4819/1977.

In addition, suitable Y compounds of this kind, those groups having the formula:
Formula (XI)

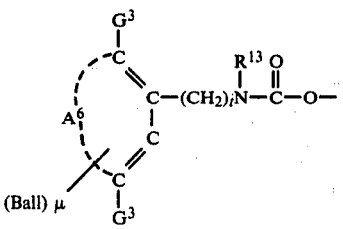

wherein Ball, $R^{13}$, t and $\mu$ are as defined in Formula (IX); $A^6$ is a group of atoms necessary to complete a benzene ring (including a benzene ring having various substituents), said benzene ring being allowed to be condensed at an appropriate position with a carbon ring or with a heterocyclic ring; and $G^3$ is hydroxyl group or a a group hydrolyzable to a hydroxy group. Examples of those groups having Formula (XI) include the following:

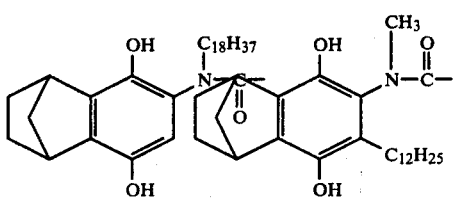

Further examples of Y compounds of this kind are described in Japanese Patent O.P.I. Publication No. 63618/1976.

As different preferred Y compounds of this kind, there are those groups having the formula:
Formula (XII)

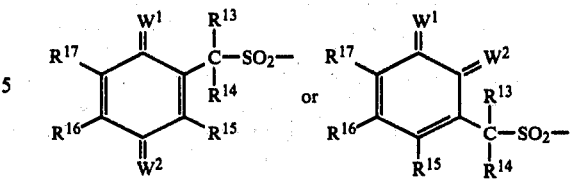

wherein $W^1$ and $W^2$ each is O or NH, said $W^1$ and $W^2$ being allowed to be either the same as or different from each other; $R^{13}$ and $R^{14}$ each is hydrogen or an alkyl group; $R^{15}$, $R^{16}$ and $R^{17}$ each is hydrogen, a halogen, an alkyl, an alkoxy or an acylamino group, or any two groups contiguous to each other of the $R^{15}$, $R^{16}$ and $R^{17}$ may be combined with each other to form a condensed ring; and at least one of the $R^{13}$, $R^{14}$, $R^{15}$, $R^{16}$ and $R^{17}$ is the Ball group as defined in Formula (IV). Those groups having Formula (XII) include the following:

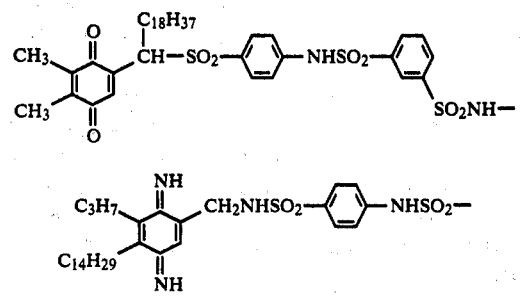

Further examples of Y compounds of this kind are described in Japanese Patent O.P.I. Publication No. 130927/1979.

For different compounds having Formula (I) of the present invention, as the Y used in the compound which is reduced under an alkaline condition to release a diffusible dye, there are those groups having the formula:
Formula (XIII)

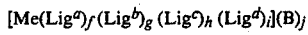

[Me(Lig$^a$)$_f$(Lig$^b$)$_g$(Lig$^c$)$_h$(Lig$^d$)$_i$](B)$_j$ wherein Me is a transition metal such as nickel, cobalt; Lig$^a$ and Lig$^b$ each is a multidentate ligand; Lig$^c$ and Lig$^d$ each is a coordinatable ligand; B is a counter ion; f is an integer of from 1 to 3; g is an integer of up to 2, provided the f is an integer of not less than 2 when g is 0; h and i each is an integer of up to 4; and j is an integer of up to 6.

Further details about those compounds having Formula (XIII) are described in the patent application specification filed on Dec. 23, 1980 by the applicant of the present invention.

The group having Formula (XIII) includes the following group:

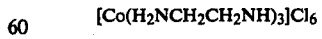

[Co(H$_2$NCH$_2$CH$_2$NH)$_3$]Cl$_6$

Those compounds having Formulas (VIII), (IX), (XII) and (XIII) described above may be used in a photographic element just as other nondiffusible dye releasing agents may be. When the compound is reduced as a function of the development of a silver halide under alkaline conditions, a metallic complex formable azo dye is released. For example, not only may direct positive type emulsions be used, but also conventional negative type silver halide emulsions are suitable.

Further, Formula (I) compounds include nondiffusible compounds (dye releasing couplers) which release a diffusible azo dye during the coupling reaction with the oxide of the color developing agent (oxidized by a silver halide). Suitable Y compounds to effect this result are those compounds having the formula:
Formula (XIV)

(Ball-Coup)v—Link wherein Ball is as defined in Formula (IV); Coup is a coupler residue capable of coupling with the oxide of a color developing agent; Link is a cleavable group (such as azo, azoxy, —O—, alkylidene, —S—, —NHSO$_2$) which is coupled with the Coup at the active site thereof, said coupling being able to be cleaved at the time of the coupling reaction of a dye image forming compound of Formula (I) having as the Y group compounds represented by Formula (XIII) with the oxide of a color developing agent; and v is an integer of 1 or 2 when the Link is an alkylidene and is 1 in the above case. Suitable groups are described in U.S. Pat. No. 3,227,550. Examples of those nondiffusible dye releasing compounds having Formula (I) in the present invention are as follows:
Exemplified Compounds:

Compound (1)

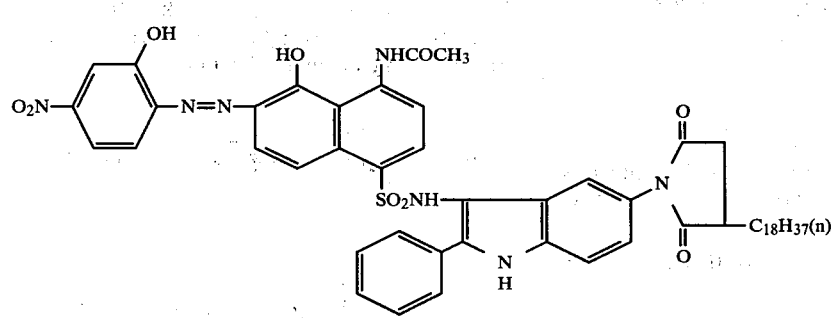

Compound (2)

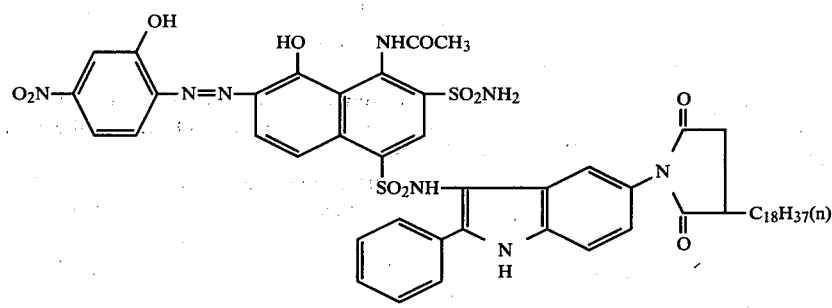

Compound (3)

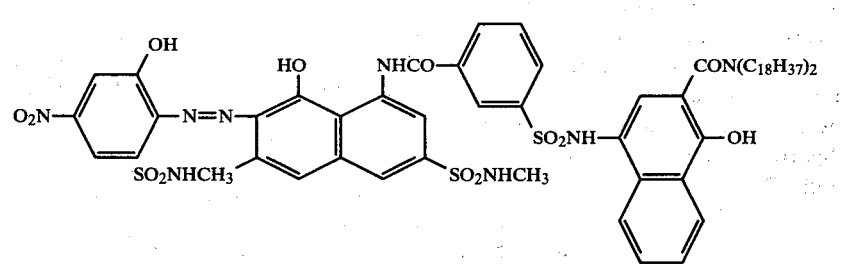

Compound (4)

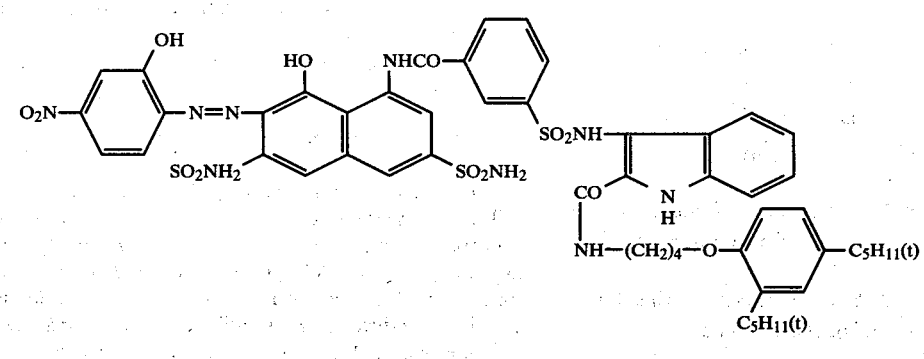

Compound (5)
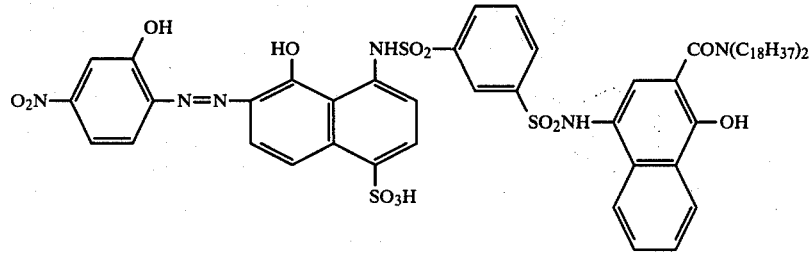
Compound (6)
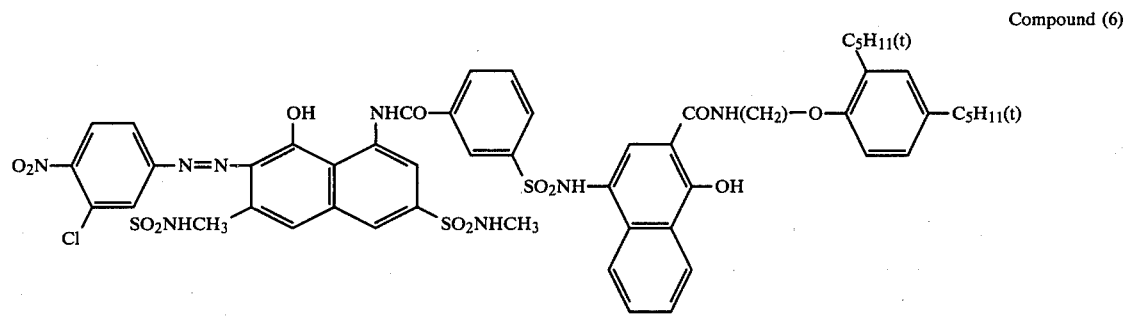
Compound (7)
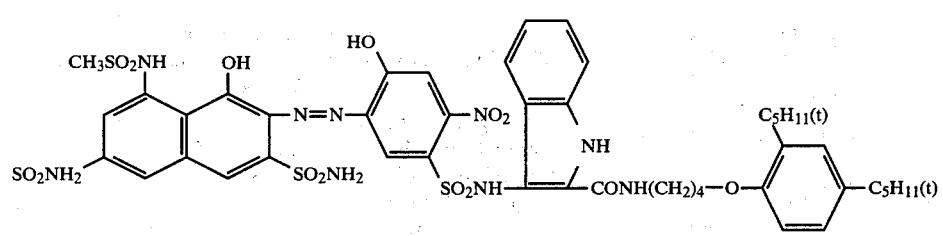
Compound (8)
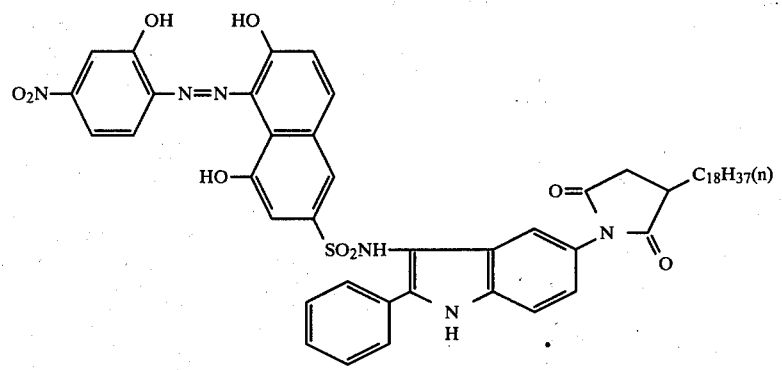
Compound (9)
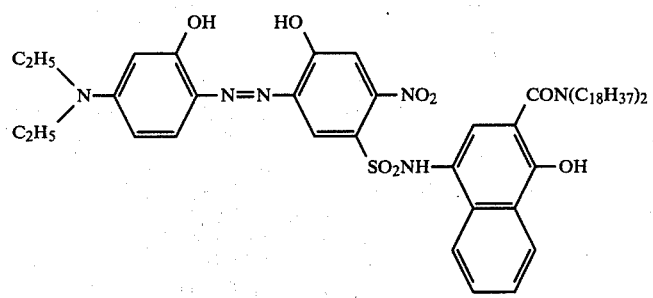

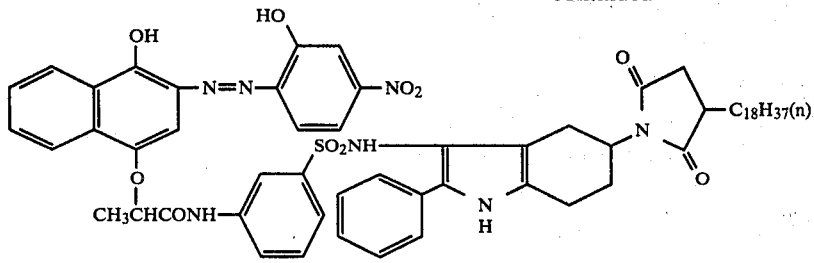

Compound (10)

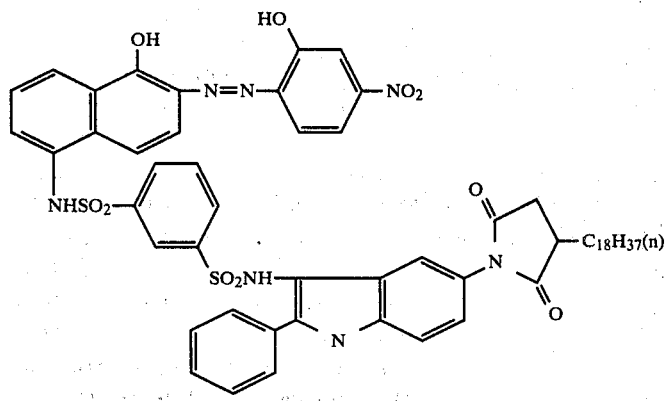

Compound (11)

The following are synthesis examples of nondiffusible dye releasing compounds having Formula (I):

SYNTHESIS EXAMPLES

Synthesis of Exemplified Compound (1)

Under a nitrogen gas flow, 2.56 g of 3-amino-5-octadecyl-succinimide-2-phenyl-indole were dissolved in 50 ml of chloroform, and 2 ml of pyridine was added to the solution upon cooling with by ice, 2.32 g of 2-(2-hydroxy-4-nitrophenyl-azo)-5-chlorosulfonyl-8-acetamide-1-naphthol were slowly added. After cooling for two hours at room temperature, the mixture was refluxed by heating for two additional hours and then was allowed to stand overnight.

20 ml of methanol and 3 ml of water were subsequently added to the mixture, which was refluxed by heating for one hour to completely decompose the unreacted sulfonyl chloride; thereafter, additional methanol is added and chloroform is driven off by boiling under reduced pressure. The resulting mixture was cooled, and 50 ml of a dilute hydrochloric acid were added. The deposited precipitate was separated by filtration, washed and then dried. The obtained product was refined by column chromatography and a yield of 2.2 g of the objective product were obtained. M.P. 162°–168° C.

Synthesis of an intermediate [2-(2-hydroxy-4-nitrophenyl-azo)-5-chlorosulfonyl-8-acetamide-1-naphthol]

4.5 g of 2-(2-hydroxy-4-nitrophenyl-azo)-5-sulfo-8-acetamide-1-naphthol were added to 20 ml of phosphorous oxichloride, and to that mixture 4 ml of DMF were added; and the reaction took place for one hour. After completion of the reaction, the reaction liquid was poured into ice water to deposit a precipitate, which was then filtered, washed and dried, thus obtaining 4.0 g of the objective product.

Synthesis of an intermediate [2-(2-hydroxy-4-nitrophenyl-azo)-5-sulfo-8-acetamide-1-naphthol]

4.0 g of 2-(2-hydroxy-4-nitrophenyl-azo)-5-amino-1-naphthol were added to 15 ml of water and to that mixture 0.5 g of sodium carbonate to be dissolved therein. 3.5 ml of acetic anhydride was added to the solution dropwise. The reaction of the mixture took place for one hour in a temperature range of 70° to 80° C. After completion of the reaction, the mixture was cooled and neutralized by the addition of concentrated hydrochloric acid to deposit a precipitate, which was filtered and then dried, thereby obtaining 4.1 g of an objective product.

Synthesis of an intermediate [2-(2-hydroxy)-4-nitrophenyl-azo)-5-sulfo-8-amino-1-naphthol]

1.54 g of 2-hydroxy-5-nitroaniline were added to a solution of 30 ml of water and 2.2 ml of concentrated hydrochloric acid and the mixture was cooled by ice. To the mixture was added a solution of 0.69 g of sodium nitrite dissolved in 2 ml of water. The mixture was cooled by ice for 30 minutes and later reacted to prepare a diazonium liquid.

On the other hand, 2.4 g of 5-sulfo-8-amino-1-naphthol were added to and dissolved in a solution of 5.2 g of sodium carbonate dissolved in 80 ml of water. The solution was cooled with ice. To this mixture the above prepared diazonium liquid was added dropwise, and the reaction of the mixture took place with cooling by ice for two hours. After the reaction, the liquid was neutralized by addition of concentrated hydrochloric acid to deposit a precipitate, which was filtered and then dried, whereby 3.9 g of an objective product were obtained.

Other exemplified compounds also were synthesized in similar manners to the above.

The method for the formation of a color photographic image in accordance with the present invention includes of the following steps (1) to (4):

(1) The imagewise exposed portion of a photographic element having the above described compound of the present invention on the support thereof is processed with an alkaline processing composition in the presence of a silver halide developing agent to thereby develop the exposed portions of the singular or multi layered silver halide emulsion.

(2) During this processing, the above dye releasing compound imagewise releases the diffusible azo dye as a function of the development of the respective silver halide emulsion layers, (3) at least one portion of the resulting azo dye image distribution diffuses into the dye image receiving layer, and (4) the azo dye image distribution is brought into contact with metallic ions thereby forming a metallic complex azo dye transfer image.

Another preferred example of the method for the formation of a color transfer image is a method consisting of the following steps (1) to (5):

(1) The imagewise exposed portion of the compound in the above described photographic light-sensitive element is processed with an alkaline processing composition in the presence of a silver halide developing agent to develop the respective exposed silver halide emulsion layers and thereby oxidize the developing agent, (2) the oxidized developing agent is cross-oxidized with the dye releasing compound, (3) the cross-oxidized dye releasing compound is alkali-hydrolyzed to be cleaved thereby releasing imagewise a diffusible azo dye as a function of the imagewise exposure of the respective silver halide emulsion layers, (4) at least one portion of the azo dye image distribution diffuses into the dye image receiving layer, and (5) the azo dye image distribution is brought into contact with metallic ions to thereby form a metallic complex azo dye transfer image.

The nondiffusible azo dye releasing compound of the present invention may be added to the silver halide emulsion layer, but it is desirable that it be added to the layer contiguous thereto.

The azo dye, released from the nondiffusible compound, in accordance with the present invention provides a tridentate ligand which forms a coordinated complex with multivalent metallic ions inside the image receiving layer. The metallic ions may be present either in the image receiving layer or in the layer contiguous thereto. And the image receiving layer, after the diffusion of the dye, may be contacted with metallic ions in the bath. The most effective multivalent metal for the present invention should react rapidly with the released dye to form a complex having a desirable hue, be strongly coordinated with the ligand, have a stable oxidized condition, be stable against light and chemicals, and further, be substantially colorless when present in the image receiving layer and inactive to the silver halide layer. Those multivalent metals having such characteristics include copper (II), nickel (II), palladium (II), zinc (II), platinum (II) and cobalt (II). Among these, the most preferred are copper (II) and nickel (II).

Compounds for use in the layer containing such metals include those polymers having metallic complex formable ligands. Examples are those polymers having the formula:

Formula (XV)

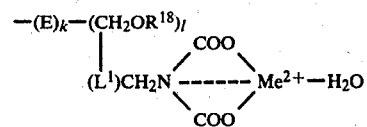

wherein E is

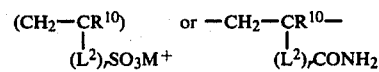

wherein $R^{10}$ is an alkyl, $L^1$ and $L^2$ each is a divalent bonding group, M is hydrogen, an ammonium cation or an alkali metal, and r is 0 or 1; $R^{18}$ is an alkyl; k is a number such that $(E)_k$ is 20 to 95% by weight of $-(E)_k-(CHCR^{18})$; l is a number such that $(CH_2CR^{18})$ is 5% to 80% by weight of $-(E)_k-(CHCR^{18})$ by weight; $Me^{2+}$ is a divalent metal such as copper (II), nickel (II), palladium (II), zinc (II), platinum (II), cobalt (II). Further examples of such compounds are described in U.S. Pat. No. 4,193,796.

As different examples, there are those polymers having the formula:

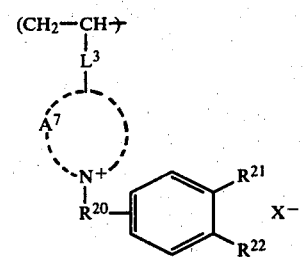

wherein $L_3$ is a single bonding or double bonding group; $A^7$ is a group of atoms necessary to complete a heterocyclic group. $R^{20}$ is a single bonding group or an alkylene group; $R^{21}$ and $R^{22}$ are chelating groups independent of each other; and $X^-$ is an anion.

These compounds are described in further detail in Japanese Patent O.P.I. Publication No. 48210/1980.

Further, for the supply of these metallic ions, in addition to the use of the above ligand polymers, there is a method wherein the metallic complex of bis(acetyl acetonate) is incorporated into a mordant layer, and another method wherein, after the diffusion transfer, the dye image portion is immersed into a water bath containing metallic ions to thereby form a metallic complex.

The complex formable azo dye of the present invention is coordinated with a multivalent metal to form, for example, a complex having the following structure:

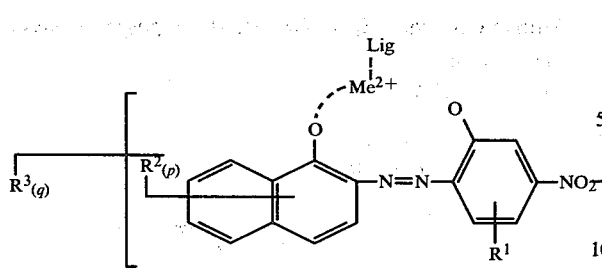

wherein $R^1$, $R^2$, $R^3$, J, P, q, m and n are as defined in Formula (I); z is a terminal group produced after the Y releases a diffusible azo dye as a function of the development of a silver halide under an alkaline condition; $Me^{2+}$ is the same as the substituent as defined in Formula (XV); and Lig is one or more ligands depending on the coordinated number of metallic ions: for example, $H_2O$, $Cl^-$, and the like.

In the above photographic light-sensitive element, after the processing and the transfer thereof, both the azo dye image distribution still remaining undiffused in the element and the developed silver are to remain together. When this remaining silver and the silver halide are removed by a known procedure, a color image is obtained which is formed from the remaining nondiffusible azo dye compound. The thus obtained dye is then made in the form of a metallic complex, thereby obtaining a highly light-resistant azo dye. Furthermore, if the azo dye image distribution, without being transferred, is diffused in a bath or the like, a residual image may also be obtained. If a negative type silver halide emulsion is used with an appropriate light-sensitive element described above, a positive color image may be obtained, while if a direct positive type silver halide emulsion layer is used, a negative color image can be obtained.

The photographic light-sensitive element may be processed with an alkaline processing composition since the development is allowed to be effected or initiated in an arbitrary manner.

The preferred application of the processing composition is the use of a rupturable container or pod containing the composition.

The processing composition used in the present invention generally contains a developing agent for the development. However, the composition is also allowed to be an alkaline solution alone. In this case, the developing solution is incorporated into the photographic light-sensitive element, image receiving element, or processing sheet, while the alkaline solution serves to activate the developing agent contained in the above element or sheet.

The photographic film unit which may be processed in accordance with the present invention is suited to be processed by passing between such a pair of juxtaposed pressure members as is seen in a camera which is so designed that a processing may be carried out within the camera. This photographic film unit consists of the following (1), (2) and (3):

(1) A photographic light-sensitive element as has been described above,
(2) an image receiving layer, and
(3) an alkaline processing composition and a means to relase the composition inside the film unit, which is such as a rupturable container suitable for being led to the following condition during the processing of the film unit; that is, when a pressure is applied by the pressure applying members to the container, then the content of the container is released inside the film unit.

In addition, this film unit contains a silver halide developing agent.

The image receiving layer of the above-described film unit may be provided thereon with a different support which is designed so that it may be superimposed on the photographic light-sensitive element after exposure. Such an image receiving element is disclosed in, e.g., U.S. Pat. No. 3,362,819. When the means to release the processing composition is a rupturable container, the processing composition is placed between the photographic light-sensitive element and the image receiving layer, and the container of the composition is subjected to a pressure applied by the pressure applying members (such as those seen in a camera designed so that a development can be carried out thereinside) thereby to release the content of the container between the image receiving layer and the outermost layer of the photographic light-sensitive element. After the processing, the dye image element is peeled apart from the photographic light-sensitive element.

The success of the photographic light-sensitive element of the present invention is illustrated with reference to the following examples, but the present invention is not limited to those disclosed.

EXAMPLE

Test of the Photographic Light-Sensitive Element

A dyed film strip containing a mixture of gelatin and a latex mordant (weight ratio 1/1), was prepared by coating a transparent polyester support with the mixture so that the coating thickness was 25 g/m², was tested for the hue, light resistance and the dependence thereof upon pH with the use of a spectrophotometer.

The latex mordant used herein is polystyrene-co-vinyl-benzyl chloride-co-N-benzyl-N,N-dimethyl-N-vinyl-benzyl-ammonium chloride-co-divinyl benzene that is disclosed in Japanese Patent O.P.I. Publication No. 73440/1976, the molar ratio of the latex mordant is 4.90:0.49:4.41:0.2.

The dye was first dissolved into a 0.86 N aqueous potassium hydroxide solution, into which was immersed an undyed mordant strip, and the immersion was continued until the transmission density thereof reached about 1.0. The strip was subsequently washed and then immersed in an aqueous solution containing metallic ions (copper (II) and nickel (II)) for about 10 minutes to form a complete metallic complex. This strip, after washing, was immersed in a standard buffer solution having a given pH value and equilibrated for about 5 minutes and then dried.

A. Hue

The absorption spectrum of the dye, dyed in the mordant, on the transparent support was measured in transmission by a spectrophotometer. The maximum wavelength (λmax) of the absorption is shown in Table 1.

B. The dependence of the hue upon pH

The dyed released from the nondiffusible dye releasing compound is alkaline during development, but turns acidic, reaching with a pH of approximately 4 as time goes by. Accordingly, the dye should show a hue stable over a wide pH range. Table 1 shows the regions where the respective dyes retain the stable hues thereof in the condition of being dyed in the mordant.

C. Light resistance

The dyed strip film was exposed to light and measured for the light resistance thereof in accordance with the following procedure.

The dyed strip piece with the transmission density of about 1.0–1.5 was exposed to a 6000 W xenon lamp light for 48 hours (60,000 lux on the surface of the strip film). Measurements were made before and after the exposure for the optical densities by λmax ($D_o$ for before the exposure, D for after the exposure), and the value of $D/D_o \times 100$ was regarded as the residual percent(%), and thus the results of the dyes from the compounds of the present invention and of the control compounds are shown in comparison in Table 1.

D. Image forming rate of DRR compound

The following multilayered monochromatic light-sensitive element was prepared, and the element was subjected to a given processing. After the processing, a dye image was observed through the transparent support, and the change in the reflection density of the dye which appeared in the mordant layer was measured by means of a photoelectric densitometer (SAKURA Photoelectric Densitometer Model PAD-60, manufactured by Konishiroku Photo Industry Co., Ltd.), and the densities obtained 30 seconds, 60 seconds and 120 seconds after the processing were taken in percentage to the final density obtained 15 minutes after the processing. Results are shown in Table 2. It shows the higher the value the faster the transfer to the mordant layer.

Preparation of Multilayered Monochromatic Light-Sensitive Element:

A multilayered monochromatic light-sensitive element was prepared by coating on a 150 μm-thick transparent polyethylene terephthalate film support with the following layers:

(1) An image receiving layer with a dried thickness of from 2.5 to 3.0 μm having gelatin and polystyrene-co-vinyl-benzyl chloride-co-N-benzyl-N,N-dimethyl-N-vinyl-benzyl ammonium chlorode-co-divinyl benzene (molar ratio 4.90:0.49:4.41:0.2), the coating amount of each component being 2.5 g/m$^2$, (2) a light-reflective layer with a dried thickness of from 7 to 8 μm having titanium dioxide (22 g/m$^2$) and gelatin (2.2 g/m$^2$), (3) an opaque layer with the dried thickness of 4 μm having carbon black (2.8 g/m$^2$) and gelatin (1.8 g/m$^2$), (4) a cyan dye releasing compound layer with the dried thickness of 2.2 μm having Exemplified Compounds (1) to (3)(1 m mol/m$^2$), N,N-diethyl-laurylamide (1.1 g/m$^2$) and gelatin (2.5 g/m$^2$), (5) a red-sensitive emulsion layer with a dried thickness of about 1.5 μm having a red-sensitive internal latent image type direct positive silver bromide emulsion (silver equivalent of 1.4 g/m$^2$), potassium 2-octadecyl-hydroquinone-5-sulfonate (0.1 g/m$^2$), formyl-4-methyl-phenyl hydrazide (13 mg/m$^2$) and gelatin (1.65 g/m$^2$), and (6) a protective layer with a dried thickness of 0.7 μm having mucochloric acid (100 mg/m$^2$) and gelatin (1 g/m$^2$).

A dispersion liquid of a DRR compound was subsequently prepared in the following manner:

One gram of a DRR compound was dissolved in 3 ml of ethyl acetate, and to the solution was added N,N-diethyl-laurylamide. The resulting solution was emulsified and dispersed into 25 ml of a 10% aqueous gelatin solution containing 0.24 g of Alkanol XC (manufactured by DuPont).

In the case of a DRR compound that is less soluble in ethyl acetate, cyclohexane was used.

Subsequently, a processing sheet was prepared by coating on a 100 μm-thick transparent polyethylene terephthalate film support with the following layers:

(1) A neutralizing layer with a dried thickness of 22.0 μm having an acrylic acid-butyl acrylate copolymer (75/25% by weight)(22 g/m$^2$), (2) a timing layer (the lower layer of a two-layer composition) with a dried thickness of 5.0 μm having cellulose diacetate (acetylated degree: 40%)(5 g/m$^2$), and (3) a second timing layer (the upper layer of a two-layer composition) with the dried thickness of 1 μm having poly(vinilydene chloride-co-acrylonitrile-co-acrylic acid)(79/15/6% by weight)(1.1 g/m$^2$).

The above-prepared multilayered monochromatic light-sensitive element was subjected to a given exposure through a silver 30-step wedge with each step differential in density of 0.15, then the above sheet was superimposed on the exposed light-sensitive element, and a pod containing 1.0 ml of the following processing composition was attached between the element and the sheet to thereby prepare a film unit. The film unit was then passed between a pair of juxtaposed pressure rollers with a gap of 340 μm therebetween, thereby rupturing the pod to spread the content thereof between the foregoing light-sensitive element and the processing sheet.

The processing composition used herein is as follows:

| | |
|---|---|
| Potassium hydroxide | 56.0 g |
| Sodium sulfite | 2.0 g |
| 4-hydroxymethyl-4-methyl-1-phenyl-pyrazolidone | 8.0 g |
| 5-methyl benzotriazole | 2.8 g |
| Carbon black (Raven-450, manufactured by Columbian Carbon) | 150.0 g |
| Carboxymethyl cellulose sodium salt (high viscosity type, manufactured by Tokyo Kasei) | 50.0 g |
| Benzyl alcohol | 1.5 ml |
| Distilled water to make | 1000.0 ml |

Several minutes later, a dye image was observed through the transparent support of the light-sensitive element.

TABLE 1

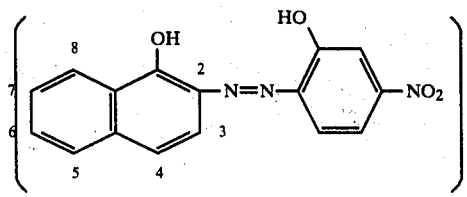

| Position and kind of substituent on the naphthalene ring of the above azo dye of this invention | | Chelate metal ion | max (nm) | Light resistance $D/D_o \times 100$ | Satisfactory hue showing pH region |
|---|---|---|---|---|---|
| 8-NH$_2$ | 3.6-SO$_2$NHCH$_3$ | — | 634 | 0 | 12~8 |
| | | Cu$^{2+}$ | 604 | 96 | 12~2 |
| | | Ni$^{2+}$ | 638 | 90 | 12~5 |
| 8-NH$_2$ | 3.6-SO$_2$NH$_2$ | — | 645 | 0 | 12~8 |
| | | Cu$^{2+}$ | 626 | 84 | 12~2 |
| | | Ni$^{2+}$ | 658 | — | — |
| 8-NHCOCH$_3$ | 3.6-SO$_2$NH$_2$ | — | 638 | 0 | 12~8 |
| | | Cu$^{2+}$ | 621 | 91 | 12~2 |
| | | Ni$^{2+}$ | 633 | 80 | 12~5 |
| 8-NH$_2$ | 5.7-SO$_2$NH$_2$ | — | 660 | 0 | 12~8 |
| | | Cu$^{2+}$ | 629 | 95 | 12~2 |
| | | Ni$^{2+}$ | 652 | 88 | 12~5 |
| 8-NHCOCH$_2$ | 5.7-SO$_2$NH$_2$ | — | 655 | 0 | 12~8 |
| | | Cu$^{2+}$ | 626 | 97 | 12~2 |
| | | Ni$^{2+}$ | 650 | 79 | 12~5 |
| 8-N(CH$_3$)$_2$ | 5.7-SO$_2$NH$_2$ | — | 659 | — | — |
| | | Cu$^{2+}$ | 638 | — | — |
| | | Ni$^{2+}$ | 656 | — | — |
| 8-NH$_2$ | 5-SO$_2$NH$_2$ | — | 652 | 0 | 12~8 |
| | | Cu$^{2+}$ | 634 | 87 | 12~2 |
| | | Ni$^{2+}$ | 650 | 81 | 12~5 |

(Control compounds)

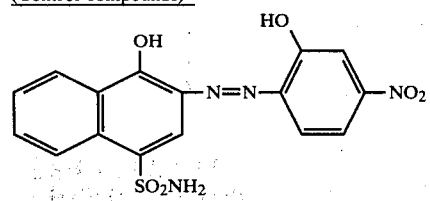

| | Chelate metal ion | max (nm) | $D/D_o \times 100$ | pH region |
|---|---|---|---|---|
| | — | 608 | 0 | 12~8 |
| | Cu$^{2+}$ | 565 | 100 | 12~2 |
| | Ni$^{2+}$ | 594 | 95 | 12~8 |

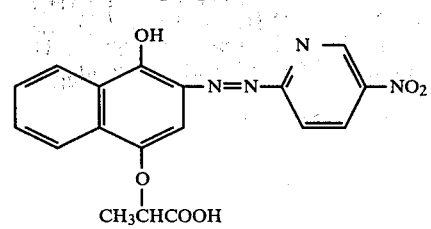

| | Chelate metal ion | max (nm) | $D/D_o \times 100$ | pH region |
|---|---|---|---|---|
| | — | 645 | 63 | 12~8 |
| | Cu$^{2+}$ | 648 | 65 | 12~5 |
| | Ni$^{2+}$ | 659 | 78 | 12~5 |

TABLE 2

| Exemplified compound | Diffusibility (%) | | |
|---|---|---|---|
| | 30 sec. | 60 sec. | 120 sec. |
| 1 | 38 | 66 | 84 |
| 2 | 45 | 73 | 92 |
| 3 | 40 | 71 | 90 |

As apparent from both of the above tables, the nondiffusible compounds of the present invention are found to have excellent light resistance thereof and are dye-releasing compounds each having a satisfactory diffusible cyan-azo dye portion which is capable of releasing a metallic complex cyan dye whose hue is stable over a wide pH range.

We claim:
1. A photographic light-sensitive element comprising a support having thereon at least one light-sensitive silver halide emulsion layer and a compound represented by the following formula (I):

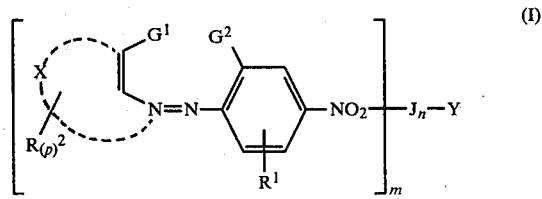

wherein G$^1$ and G$^2$ independently represent an hydroxy group, an alkali salt thereof or a group which is capable of being hydrolyzed under alkaline conditions, R$^1$ represents a hydrogen atom, a halogen atom; an alkyl, alkoxy, sulfamoyl, carbamoyl, or alkoxycarbonyl, provided that said respective groups may be substituted, or cyano group; R$^2$ represents —NH$_2$, —NHR$^4$, —N(R$^4$)$_2$, —NHSO$_2$NHR$^4$, —NHSO$_2$NHR$^4$, —NHCOR$^4$, —NHSO$_3$R$^4$, —OH, —OR$^4$, —OCOR$^4$ or —OCO$_2$R$^4$ wherein R$^4$ represents an alkyl or aryl provided that respective groups may be substituted; X represents a group of atoms necessary to complete a naphthalene or benzene ring provided that said respective rings may be substituted; Y represents a ballasting carrier portion which is capable of releasing a diffusible azo dye as a function of the development of the silver halide in said silver halide emulsion layer under alkaline conditions; J represents a divalent linking group; p is an integer of 1 or 2; m is an integer of 1 to 3; and n is 0 or an integer not more than m.

2. A photographic light-sensitive element according to claim 1, wherein said compound is a nondiffusible cyan dye releasing compound.

3. A photographic light-sensitive element according to claim 2, wherein said compound has at least one diffusible cyan azo dye portion or a precursor portion thereof, which is capable of being released as a function of the development of the silver halide in said silver halide emulsion layer under alkaline conditions.

4. A photographic light-sensitive element according to claim 1, wherein said compound has the formula (II):

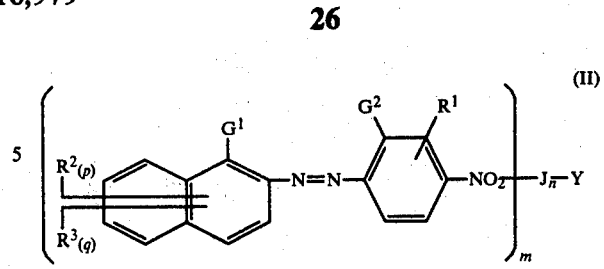

wherein G$^1$, G$^2$, R$^1$, R$^2$, Y, J, m and n have the same definition as in formula (I); R$^3$ represents —SO$_2$NH$_2$, —SO$_2$NHR$^4$, —SO$_3$H, —CONH$_2$, —CONHR$^4$ or —COOH; wherein R$^4$ has the same definition as in formula (I); p is an integer of 1 or 2; and q is an integer of 0, 1 or 2.

5. A photographic light-sensitive element according to claim 4, wherein p is 1 and R$^2$ is substituted at the eighth position of the naphthalene ring with respect to G$^1$.

6. A photographic light-sensitive element according to claim 1, wherein said compound has the formula (III):

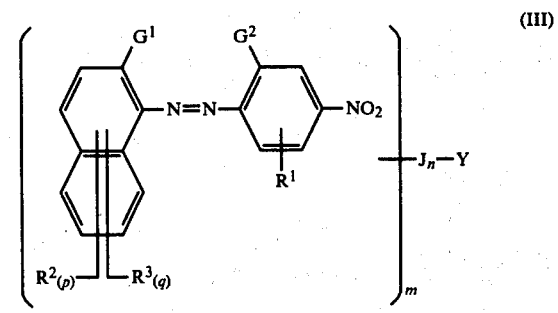

wherein G$^1$, G$^2$, R$^1$, R$^2$, Y, J, m and n have the same definition as in formula (I); R$^3$ represents —SO$_2$NH$_2$, SO$_2$NHR$_4$, —SO$_3$H, —CONH$_2$, —CONHR$^4$ or —COOH; wherein R$^4$ has the same definition as in formula (I), p is an integer of 1 or 2; and q is an integer of 0, 1 or 2.

* * * * *

UNITED STATES PATENT AND TRADEMARK OFFICE
CERTIFICATE OF CORRECTION

PATENT NO. : 4,416,979
DATED : November 22, 1983
INVENTOR(S) : Takahashi et al.

It is certified that error appears in the above—identified patent and that said Letters Patent is hereby corrected as shown below:

Claim 1, formula (I), "$R_{(p)}{}^2$" should be -- $R^2{}_{(p)}$ --.

Signed and Sealed this

Fourteenth Day of February 1984

[SEAL]

Attest:

GERALD J. MOSSINGHOFF

*Attesting Officer*      *Commissioner of Patents and Trademarks*